United States Patent
Lavender

[19]

[11] Patent Number: 6,158,784
[45] Date of Patent: Dec. 12, 2000

[54] CONNECTOR FOR TUBULAR MEMBERS

[75] Inventor: Cecil Lee Lavender, Ocilla, Ga.

[73] Assignee: Aeroquip Corporation, Maumee, Ohio

[21] Appl. No.: 09/056,564

[22] Filed: Apr. 7, 1998

[51] Int. Cl.[7] .................................................. F16L 33/24
[52] U.S. Cl. ...................... 285/239; 285/259; 285/131.1
[58] Field of Search ..................................... 285/238, 239, 285/240, 259, 255, 249, 250, 131.1

[56] References Cited

U.S. PATENT DOCUMENTS

| | | | |
|---|---|---|---|
| 48,709 | 7/1865 | Emery | 285/251 |
| 509,458 | 11/1893 | Still | 285/251 |
| 595,927 | 12/1897 | Temple | 285/239 |
| 928,237 | 7/1909 | Baird | 285/251 |
| 1,698,195 | 1/1929 | Karbowski | 285/251 |
| 1,974,635 | 9/1934 | Weinke | 285/251 |
| 1,996,855 | 4/1935 | Cheswright | 285/239 |
| 2,498,831 | 2/1950 | Veitch | 285/260 |
| 2,816,781 | 12/1957 | Woodling | 285/251 |
| 2,907,587 | 10/1959 | Harris | 285/240 |
| 3,966,238 | 6/1976 | Washkewicz et al. | 285/239 |
| 4,019,512 | 4/1977 | Tenczar | 604/905 |
| 4,219,221 | 8/1980 | Webb | 285/3 |
| 4,585,034 | 4/1986 | Hubbard et al. | 138/111 |
| 4,597,594 | 7/1986 | Kacalieff et al. | 285/239 |
| 4,673,400 | 6/1987 | Martin | 604/905 |
| 4,674,167 | 6/1987 | Hubbard et al. | 29/401.1 |
| 5,487,571 | 1/1996 | Robertson | 285/239 |
| 5,624,139 | 4/1997 | Van Kooten | 285/31 |

FOREIGN PATENT DOCUMENTS

| | | | |
|---|---|---|---|
| 154926 | 9/1985 | European Pat. Off. | 285/239 |
| 727340 | 6/1932 | France . | |
| 86137 | 7/1957 | Netherlands . | |
| 531186 | 12/1940 | United Kingdom . | |
| WO 97/47910 | 12/1997 | WIPO . | |

OTHER PUBLICATIONS

Brochure of Aeroquip Corporation, a TRINOVA company, copyrighted 1991 entitled "FODUCT TM Fiber Optic High–capacity, flexible, innerduct for the fiber optic cable". See particularly p. 4.

*Primary Examiner*—Eric K. Nicholson
*Attorney, Agent, or Firm*—Emch, Schaffer, Schaub & Porcello, Co., L.P.A.

[57] ABSTRACT

A connector for joining together lengths of plastic tubing has a plurality of external annular barbs and an insertion end portion having spaced apart first and second end edges with tapered edges extending therefrom to a cylindrical portion from which the annular barbs extend.

25 Claims, 6 Drawing Sheets

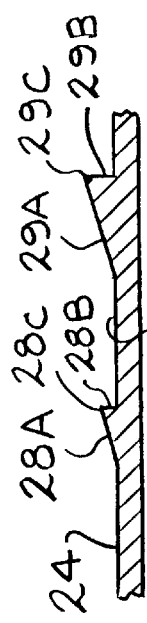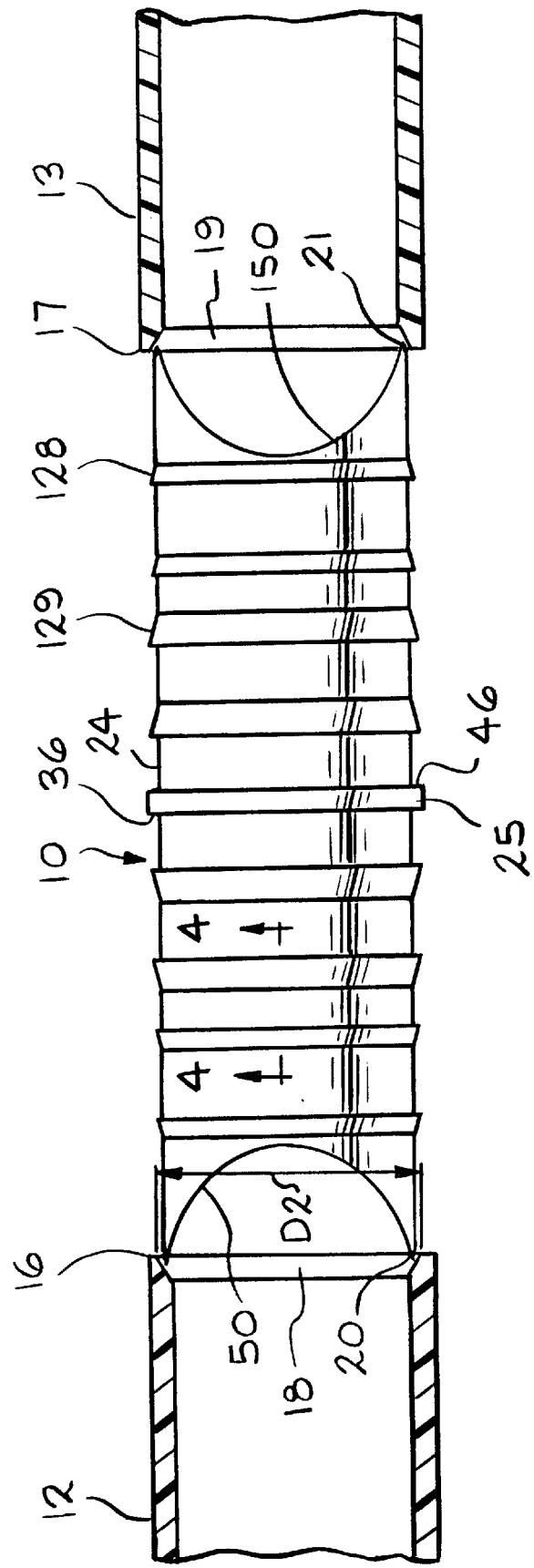

CONNECTOR FOR TUBULAR MEMBERS

BACKGROUND ART

In conduit systems utilizing a plurality of lengths of tubular pipes or conduits, connector means must be provided for joining together the various lengths of tubing. Although connectors which engage the exterior surface of the tubing are well known, for some applications it is highly desirable to utilize a connector which engages the interior surfaces of the lengths of tubing being joined together. Exterior connectors are bulky and have outside diameters larger than the tubes. Additionally, for some applications, it is desirable that the internal diameter of the passageway defined by the interconnected lengths of tubing and the connector internal surface be substantially uniform. The desirability of having an uniform diameter passageway for the joined lengths of tubing and connector is particularly strong for joined tubes forming part of a fluid supply system or a system where wires or fiber optic bundles are passed through. Prior art conduit systems utilizing the "interior surface engagement" type of connector for joining adjacent lengths of tubing result in a passageway constriction which restricts the flow of fluid.

It is also important that the connector or coupler in combination with joined lengths of tubing meet certain minimum pull strength requirements. For some applications, such as joined lengths of tubing having fiber optic bundles passed therethrough using high speed air blowing systems, it is desirable that the joined lengths of tubing be capable of withstanding a predetermined amount of pressure with no significant loss of pressure.

DISCLOSURE OF THE INVENTION

The present invention is directed to a connector or coupler for joining together two lengths of plastic tubing by a straight axial movement of the coupler relative to the length of tubing to be engaged to effect engagement of the interior wall surface of the tubing with the exterior end portion of the connector. The connector has a cylindrical internal surface defining a passageway extending along an axis. The internal diameter of the passageway is no less than the internal diameter requirements of the length of tubing. When connected, the combination of the connector and the length of tubing is capable of withstanding, without significant fluid leakage, internal pressures developed by the rapid flow of fluid required for passing of fiber optic bundles through the connector and joined lengths of tubing. Additionally, the combination can withstand significant axial pull force without the connector separating from the length or lengths of tubing. The present invention is also directed to the combination of a connector and tubing and to a method for forming such combination. The tubing, prior to its engagement by the connector, has a substantially uniform internal diameter throughout except at the ends to be joined by the connector. Preferably the internal surface of the tubing is skived or chamfered at the ends to be joined by the connector. The tubing is formed of a material having some resiliency and capability of being expanded. For example, the tubing is desirably manufactured of a plastic material such as high density polyethylene. In contrast, the connector is manufactured of a more rigid material such as metal, stainless steel or brass, for example, or a plastic material having significantly more rigidity than the material from which the tubing is manufactured.

The connector extends along an axis from a first end to a second end and has a plurality of spaced apart annular barbs extending outwardly from its external wall surface. The end portion of the connector intended to be inserted into the end of a length of tubing to be connected thereto is formed or cut to define a pair of recesses extending rearwardly from a pair of truncated end edges. The recesses are located on opposite sides of the axis from one another. The truncated end edges are also located on opposite sides of the axis from one another. A line drawn between the centers of the truncated end edges will pass through the axis. When viewed in elevation with the connector oriented such that the viewer's eyes are aligned with a line passing through the centers of the truncated end edges and the axis, each of the cut edges extending from one end edge to the opposing end edge will appear as a substantially straight line disposed at an angle of 40° to 60° relative to the axis. When the connector is rotated about the axis 90° from such orientation, each of the cut edges will be seen as an arc extending between each of said end edges.

The barbs are separated from one another by sections of a substantially cylindrical external wall surface. Each barb has a (1) first surface which tapers outwardly in a direction away from the end being inserted in the tubing, (2) an apex and (3) a second surface extending from the apex to the cylindrical external wall surface. In a preferred embodiment, the barb closest to the end edges extends outwardly a first distance such that its apex defines a first diameter and the barb spaced furthest from such end edges extends outwardly a greater distance such that its apex defines a second diameter larger than the first diameter.

In a preferred embodiment, the connector external wall surfaces in the areas between the annular barbs are substantially cylindrical and of uniform diameter slightly larger than the interior cylindrical diameter of the length of tubing to which it is to be connected. However, as a result of the interior skive or chamfer at the engagement end of the length of tubing, the interior diameter at such tubing end chamfer is slightly larger than the outside diameter of the connector external wall surface. Such size relationship along with the connector end configuration permits the connector to be readily inserted into such tubing end with a straight axial push of sufficient force to cause the tubing end and adjacent portion to expand as the connector moves therein.

In another embodiment, it is possible to engage the connector with a length of tubing which does not have an internal skive or chamfer at its engagement end. As a result of the truncated end edges defining the end to be inserted, it is possible to begin inserting the connector into the end of the length of such unskived tubing simply by squeezing and temporarily deforming the tubing open end to approximate an oval shape thereby increasing the size of the opening along the long axis of the oval to a size larger than the outside cylindrical external surface of the connector and orienting the connector such that the opposing truncated end edges have their centers oriented with said long axis thereby permitting such end edges to fit in the ovally enlarged portions of the tubing engagement end.

IN THE DRAWINGS

FIG. 3 is a view similar to FIG. 2 but showing the connector and tubing rotated 90° about the axis and with the connector closer to engagement with the end of the length of tubing.

FIG. 4 is an enlarged sectional view taken through line 4—4 of FIG. 3.

DESCRIPTION OF THE PREFERRED EMBODIMENTS

Figure 1:
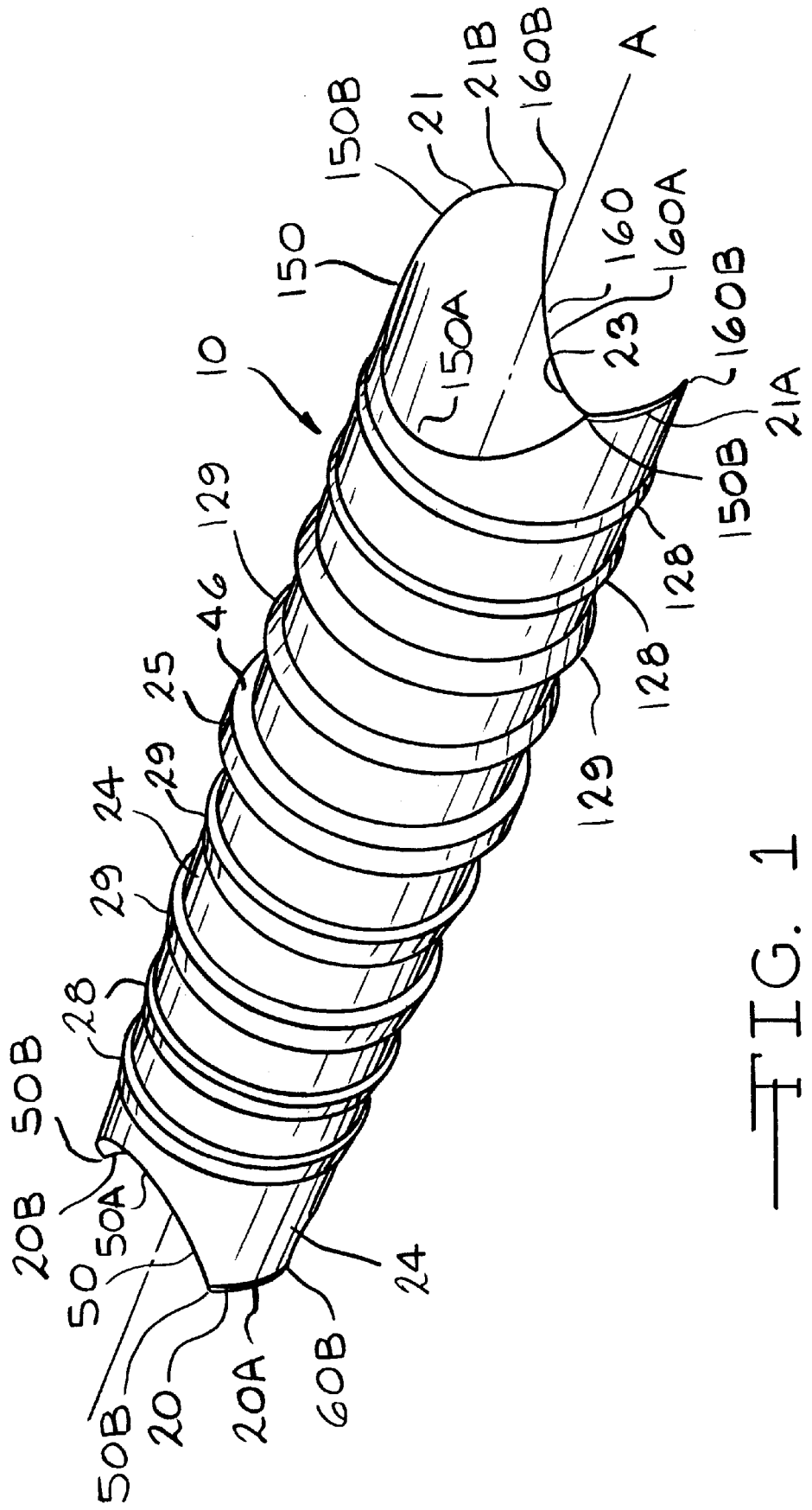
FIG. 1 is a perspective view of the connector of the present invention.

Referring now to the drawings, there is shown a connector 10 and a pair of tubular members 12 and 13 which are components of an overall tubular system (not shown). The tubular system may, for example, be a system for controlling the flow of fluids or a system forming a portion of a fiber optic duct insert. Various types of fiber optic duct inserts are disclosed in U.S. Pat. Nos. 4,582,093 and 4,674,167, both of which are assigned to the assignee of the present application. Although such prior art multi-chambered conduit inserts or fiber optic inserts are shown with sections of tubing having non-circular cross-sections, the connector of the present invention is preferably used with tubing and tubular sections having a circular internal configuration.

As shown, the tubular member 12 has an internal surface 14 and tubular member 13 has an internal surface 15, each of which internal surfaces 14 and 15 has a circular cross-sectional configuration of predetermined diameter D1. The connector of the present invention is particularly well suited for use with plastic tubing having an internal diameter on the order of one-half inch to four inches; however, it could be used with tubing having larger or smaller diameters. The tubular member 12, the connector 10 and the tubular member 13 are shown aligned along an axis A. The tubular member 12 has an end face 16 which preferably lies in a plane substantially perpendicular to the axis A and the tubular member 13 has an end face 17 which also preferably lies in a plane substantially perpendicular to the axis A.

The connector 10 extends from a first end 20 to a second end 21 and has a passageway 22 extending therethrough. The passageway 22 is defined by an inwardly facing wall surface 23 which lies on a cylinder having a diameter substantially equal to the diameter D1 of the internal surface 14 and internal surface 15 of the tubular members 12 and 13, respectively.

Externally, the connector 10 has a cylindrical wall surface 24 with a central collar 25 extending outwardly therefrom. The collar 25 has a first shoulder 36 and a second shoulder 46. Between the first end 20 and the collar 25 are a first pair of annular barbs 28 and a second pair of annular barbs 29. Between the second end 21 and the collar 25 are a third pair of annular barbs 128 and a fourth pair of annular barbs 129.

Each of the first pair of annular barbs 28 includes a first tapering surface 28A tapering outwardly from the cylindrical wall surface 24 in a direction away from the end 20 and a second wall surface 28B joined to the tapering wall surface 28A at an apex 28C. The second wall surface 28B extends radially inwardly from the apex 28C to the cylindrical wall surface 24. The tapering wall surfaces 28A are disposed at an angle in the range of 10° to 20° relative to the axis A.

Similarly the second pair of annular barbs 29 each has a first tapering wall surface 29A tapering outwardly in a direction away from the first end 20 and a second wall surface 29B joined thereto at an apex 29C. The second wall surface extends radially inwardly from the apex 29C to the cylindrical wall surface 24. The tapering wall surfaces 29A are disposed at an angle of 10° to 20° relative to the axis A. The apex 29C extends outwardly from the axis A a greater distance than the apex 28C and, therefore, function to deform the inner surface 14 or 15 of the respective tubular member 12 or 13 engaged thereto outwardly a greater amount than the first pair of annular barbs 28. Each of the apexes 28C and 29C are sharp so that any tendency of the connector 10 to be pulled out of the tubular member 12 or 13 will cause the apexes 28C and 29C to dig in or cut in to the internal surface 14 or 15 of the respective tubular member 12 or 13 and prevent removal of either tubular member except upon a pulling force greatly in excess of that anticipated for the intended conditions of use. For example, as can be seen in Tables 1–4, connectors attached to a 1-inch innerduct plastic tubular member successfully withstood pull forces greater than 900 pounds while connectors attached to a 1.25 inch innerduct tubular member successfully withstood pull forces greater than 1500 pounds.

The third pair of annular barbs 128 and fourth pair of annular barbs 129, positioned between the second end 21 and the collar 25, are tapered in a reverse direction from the first and second pair of annular barbs 28 and 29 so that they have tapering wall surfaces 128A and 128B which taper outwardly in a direction away from the second end 21. Except for such reversal, the third pair of annular barbs 128 and fourth pair of annular barbs 129 are similar to the first pair of annular barbs 28 and second pair of annular barbs 29 and will not be described further.

As an example, for a connector 10 in which the outer cylindrical wall surface 24 has a diameter on the order of 1.41 inches, the apex 28C may have a diameter of 1.47 inches and the apex 29C may have a diameter slightly greater than 1.5 inches.

Figure 2:
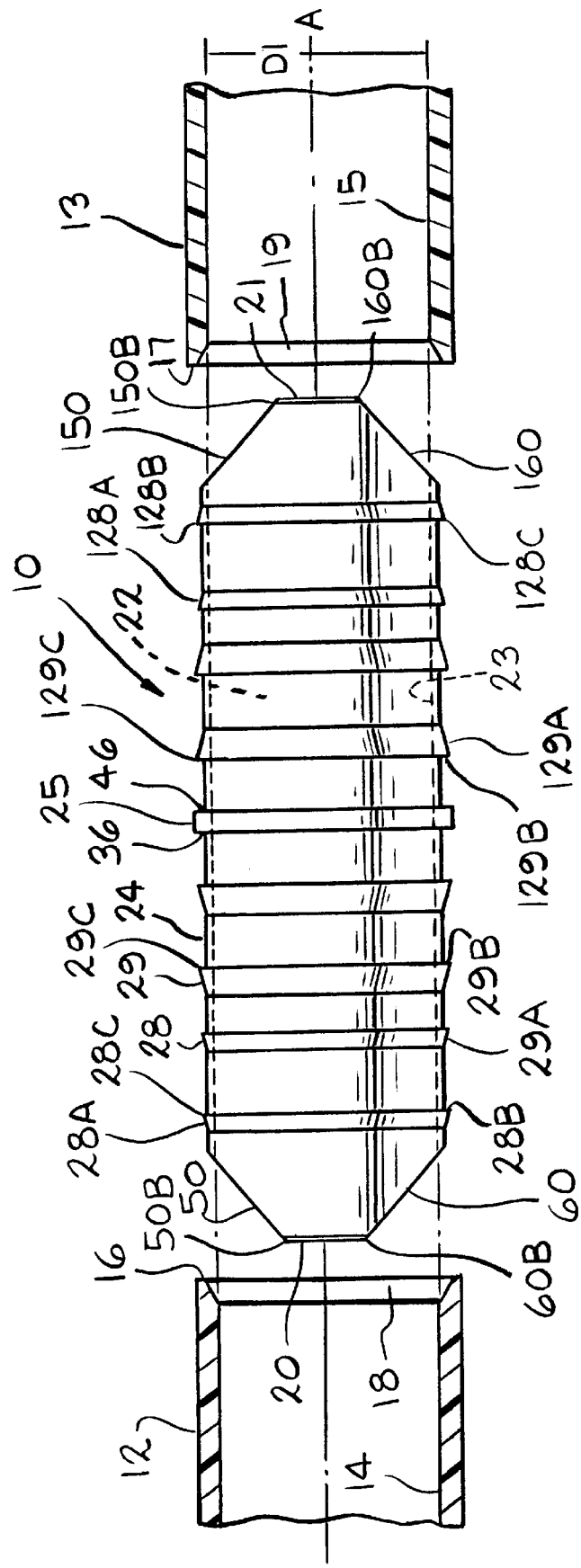
FIG. 2 is a side elevational view showing the connector with the end portion of a length of tubing about to be affixed thereto.

The portion of the connector 10 between the first end 20 and the closest of the first pair of annular barbs 28 will now be described. At a point slightly spaced from the annular barb 28 closest to the first end 20, there is formed or cut a tapered edge 50 which, when viewed in elevation in the orientation shown in FIG. 2, appears as a straight line extending from a point of origin 50A at the cylindrical wall surface 24 to two spaced apart points of intersection 50B, 50B at the end 20. When viewed in elevation with the connector 10 rotated 90° about the axis A as shown in FIG. 3, the edge 50 appears as an arc. A second cut edge 60 extends from the cylindrical surface 24 beginning at a radially outermost point of origin 60A disposed 180° from the point 50A and extends at substantially the same angular disposition to the axis A as the first edge 50 to a pair of points 60B intersecting with the first end 20. As can be seen in the drawings, the respective points of intersection 50B and 60B at the end 20 define first and second spaced apart end edges 20A and 20B. Similar edges 150 and 160 are formed or cut in the area of the second end 21 and extend from points of origin 150A and 160A. Their respective points of intersection 150B and 160B with the end 21 define first and second spaced apart end edges 21A and 21B.

The end edges 20A and 20B have a slight chamfer at the outer wall surface disposed at an angle of approximately 15° to the axis A and extending at a distance in the order of 0.05 inch from the ends 20 and 21 respectively. Except for the slight reduction in size resulting from the 15° chamfer, the distance between the end edges 20A and 20B is equal to the diameter of the cylindrical outer surface 24 and is larger than the internal diameter D1 of the internal surfaces 14 and 15 of the respective tubular members 12 and 13. Preferably each of the end edges 20A and 20B lie on a first plane disposed perpendicular to the axis A. Similarly, the edges 21A and 21B lie on a second plane which is also perpendicular to the Axis A but spaced apart from the first plane.

In a preferred embodiment, the tubular member 12 is provided with a skive or chamfer 18 extending from its end face 16 at an angle to intersect with the internal surface 14. The tubular member 13 is provided with a skive or chamfer 19 extending from its end face 17 at an angle relative to the axis A to intersect with the internal surface 15. The intersection of the chamfer 18 with the end face 16 defines a circle having a diameter D2 which is not only greater than the diameter D1 but is also greater than the diameter of the external cylindrical wall surface 24. The intersection of the chamfer 19 with the end face 17 also defines a circle having a diameter D2.

Figure 5:
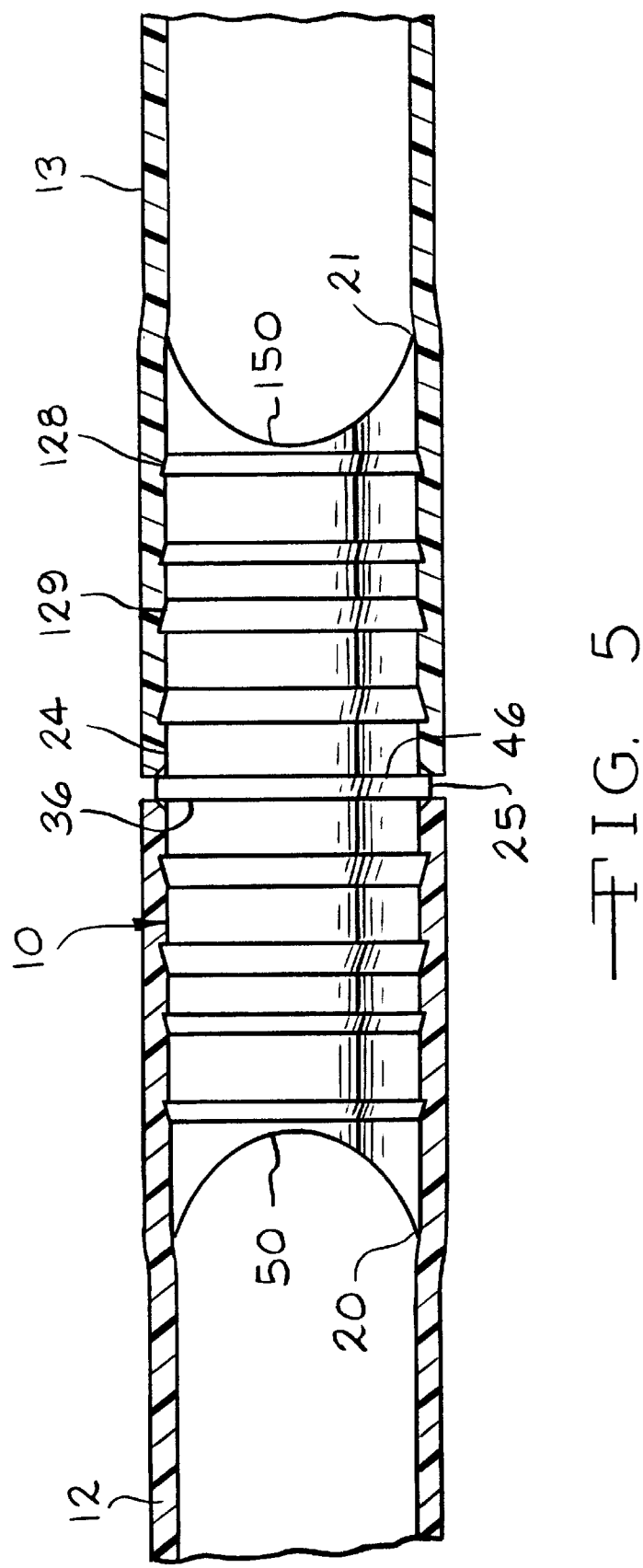
FIG. 5 is a sectional view taken through two lengths of tubing joined to the connector of FIGS. 1–4.

As can be seen from FIG. 3, by virtue of the chamfer 18 and its intersection with the end face 16 having a diameter D2 larger than the diameter of the external cylindrical wall surface 24, the end edges 20A and 20B will contact the chamfer 18 upon insertion of the connector 10 into the end 16 of the tubular member 12. Movement of the connector 10 along the axis A under whatever force is required to deform and expand the end portion of tubular member 12 will continue until the end face 16 engages the collar 25 at which point the connector 10 is fully and sealingly engaged with the tubular member 12. A similar axial movement of the connector 10 into the tubular member 13 will similarly effect engagement of the second tubular member 13 to the connector 10 as shown in FIG. 5.

The connector 10 could also be inserted in a tubular member which is not provided with a chamfer such as the chamfer 18 even though the tubular member had the same relative dimensions to the connector 10 as the internal surface 14 of the tubular member 12. In that case, when it is desired to insert the end 20 of the connector 10 into tubular member it is necessary to simply squeeze the tubular member 12 in the area of its end 16 to deform the tubular member in the area of the end to approximate an oval such that the maximum distance across the internal surface 14 (i.e. along the length of the oval), is greater than the distance between the end edges 20A and 20B. This will permit the connector 10 to have a lead-in into the tubular member so that the connector can continue to be pushed therein with the internal surface of the tubing adjacent the end face being ramped outwardly by the edges 50 and 60 and, as the connector 10 continues inwardly, ramped outwardly by the tapered surfaces 28A and tapered surfaces 29A.

Figure 6:
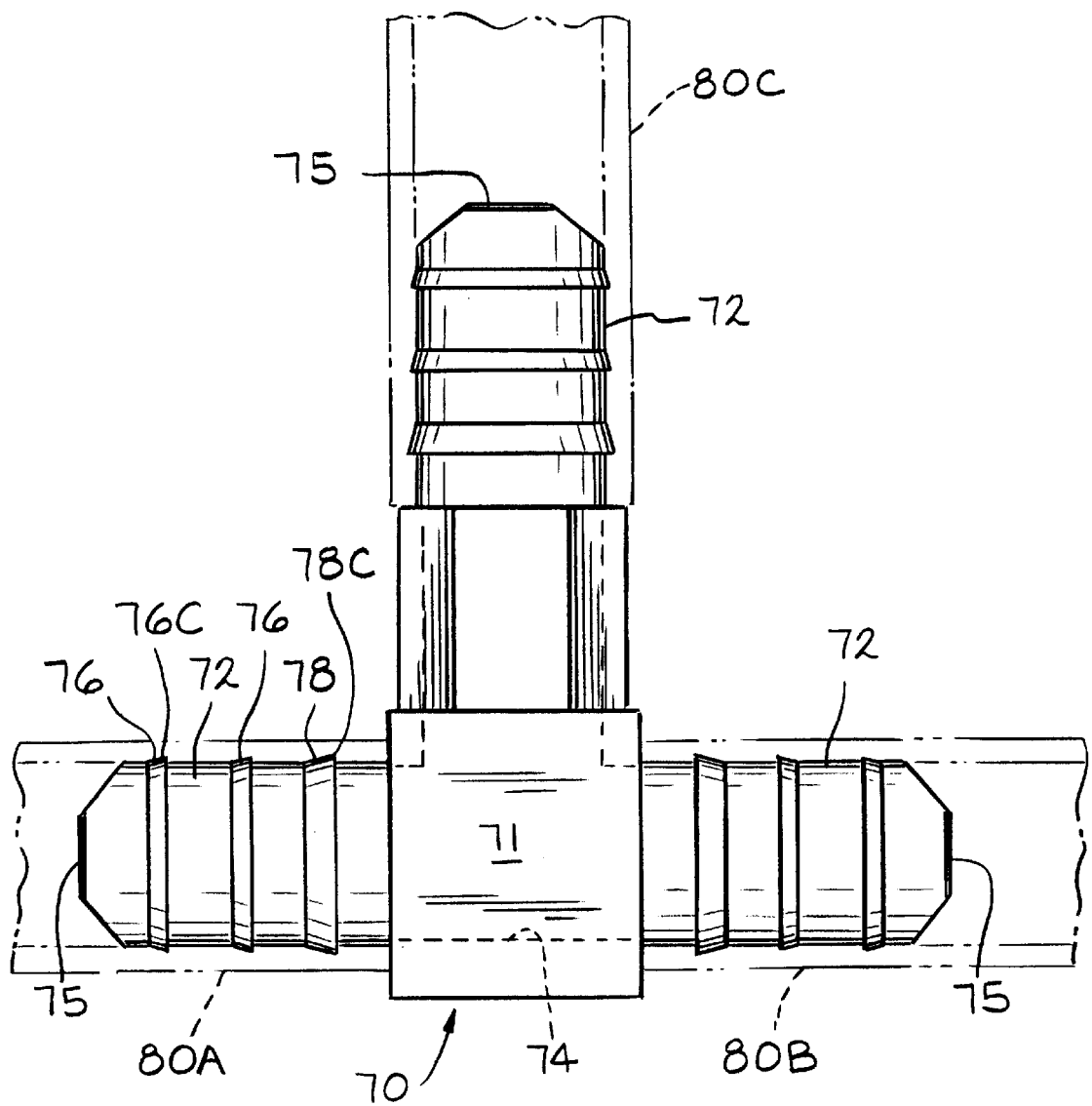
FIG. 6 is a top plan view of a T-shaped connector.

Referring now to FIG. 6, there is shown a modified connector assembly 70 with individual connectors 72 extending therefrom. The connectors 72 may be formed integrally with the housing 71 with each being a unitary part thereof. Alternatively, the individual connectors may be separately formed and brazed or otherwise fastened to the housing 71. The housing 71 has a T-shaped passageway 74 communicating with the passageway of each of the connectors 72.

Each connector 72 extends from a leading end 75 intended for insertion in a length of plastic tubing shown in phantom lines and designated 80A, 80B and 80C. Each connector 72 has a passageway similar to the passageway described with respect to the embodiment of FIGS. 1 through 5. Additionally, the portion of each connector 72 adjacent the end 75 is similar to the ends 20 and 21 described with respect to the embodiment of FIGS. 1 through 5.

Each of the connectors 72 has a first and second annular barb 76 having an apex 76C of substantially the same diameter as that described with respect to the apex 28C of the embodiment of FIGS. 1 through 5. Additionally, the connector has a third annular barb 78 having an apex 78C which has a larger diameter than the apex 76C of the other two barbs. This particular connector 72 is hereinafter described as a 3-ring connector in contrast to the 4-ring connector of the embodiment shown in FIGS. 1 through 5. Except for the difference in number of the annular barbs, each connector 72 is substantially as described with respect to the embodiment of FIG. 2 for those portions between the collar 25 and the respective ends 20 and 21.

The connector of the present invention can withstand a minimum working pull strength of 700 lbs. for a one inch innerduct and a minimum pull load of 1100 lbs. for a 1.25 inch SDR 13.5 interduct. Tables 1 through 4 show the amount of movement between connectors and engaged tubing in inches when subjected to varying degrees of pull load for various sizes including 1-inch innerduct with 3-ring connector (Table 1), 1-inch innerduct with 4-ring connector (Table 2), 1.25 inch innerduct with 3-ring connector (Table 3) and 1.25 inch innerduct with 4-ring connector (Table 4). Additionally, each of the connectors retain pressures substantially in excess of the required objective of 100 psi at 23° C.±5° C. Tables 5, 6, 7 and 8 show the results of the various connectors and sizes when tested to pressures up to 3000 psi. As can be seen from the Tables, the combination of the connectors with the tubular segment successfully exceeded the desired objectives.

TABLE 1

1-Inch Innerduct With 3-Ring Connector (3-Barbs)

| Sample | Total Duct/Connector Movement (inches) | Peak Force (lbs) | Pass/Fail |
|---|---|---|---|
| 1 | 0.009 | 1055 | Pass |
| 2 | 0.006 | 960 | Pass |
| 3 | 0.006 | 980 | Pass |
| 4 | 0.002 | 1040 | Pass |
| 5 | 0.006 | 980 | Pass |

TABLE 2

1-Inch Innerduct With 4-Ring Connector (4-Barbs)

| Sample | Total Duct/Connector Movement (inches) | Peak Force (lbs) | Pass/Fail |
|---|---|---|---|
| 1 | 0.004 | 1038 | Pass |
| 2 | 0.001 | 1000 | Pass |
| 3 | 0.003 | 950 | Pass |
| 4 | 0.002 | 980 | Pass |
| 5 | 0.003 | 980 | Pass |

TABLE 3

1.25-Inch Innerduct With 3-Ring Connector (3-Barbs)

| Sample | Total Duct/Connector Movement (inches) | Peak Force (lbs) | Pass/Fail |
|---|---|---|---|
| 1 | 0.02 | 1600 | Pass |
| 2 | 0.018 | 1600 | Pass |
| 3 | 0.007 | 1550 | Pass |
| 4 | 0.012 | 1560 | Pass |
| 5 | 0.011 | 1675 | Pass |

TABLE 4

1.25-Inch Innerduct With 4-Ring Connector (4-Barbs)

| Sample | Total Duct/Connector Movement (inches) | Peak Force (lbs) | Pass/Fail |
| --- | --- | --- | --- |
| 1 | 0.009 | 1610 | Pass |
| 2 | 0.017 | 1620 | Pass |
| 3 | 0.008 | 1640 | Pass |
| 4 | 0.005 | 1620 | Pass |
| 5 | 0.004 | 1595 | Pass |

TABLE 5

1-Inch Innerduct With 3-Ring Connector (3-Barbs)

| Sample | Maximum Pressure Achieved (psi) | Comments | Pass/Fail |
| --- | --- | --- | --- |
| 1 | 300 | Held 125 psi 5 minutes. Held at 300 psi. | Pass |
| 2 | 300 | Held 125 psi 5 minutes. Held at 300 psi. | Pass |
| 3 | 300 | Held 125 psi 5 minutes. Held at 300 psi. | Pass |
| 4 | 300 | Held 125 psi 5 minutes. Held at 300 psi. | Pass |
| 5 | 300 | Held 125 psi 5 minutes. Held at 300 psi. | Pass |

TABLE 6

1-Inch Innerduct With 4-Ring Connector (4-Barbs)

| Sample | Maximum Pressure Achieved (psi) | Comments | Pass/Fail |
| --- | --- | --- | --- |
| 1 | 300 | Held 125 psi 5 minutes. Held at 300 psi. | Pass |
| 2 | 300 | Held 125 psi 5 minutes. Held at 300 psi. | Pass |
| 3 | 300 | Held 125 psi 5 minutes. Held at 300 psi. | Pass |
| 4 | 300 | Held 125 psi 5 minutes. Held at 300 psi. | Pass |
| 5 | 300 | Held 125 psi 5 minutes. Held at 300 psi. | Pass |

TABLE 7

1.25-Inch Innerduct With 3-Ring Connector (3-Barbs)

| Sample | Maximum Pressure Achieved (psi) | Comments | Pass/Fail |
| --- | --- | --- | --- |
| 1 | 200 | Held 125 psi 5 minutes. Leaked at 200 psi. | Pass |
| 2 | 255 | Held 125 psi 5 minutes. Leaked at 255 psi. | Pass |
| 3 | 300 | Held 125 psi 5 minutes. Held at 300 psi. | Pass |
| 4 | 300 | Held 125 psi 5 minutes. Held at 300 psi. | Pass |
| 5 | 250 | Held 125 psi 5 minutes. Connector blew out at 250 psi. | Pass |

TABLE 8

1.25-Inch Innerduct With 4-Ring Connector (4-Barbs)

| Sample | Maximum Pressure Achieved (psi) | Comments | Pass/Fail |
| --- | --- | --- | --- |
| 1 | 275 | Held 125 psi 5 minutes. Leaked at 275 psi. | Pass |
| 2 | 300 | Held 125 psi 5 minutes. Held at 300 psi. | Pass |
| 3 | 300 | Held 125 psi 5 minutes. Held at 300 psi. | Pass |
| 4 | 300 | Held 125 psi 5 minutes. Held at 300 psi. | Pass |
| 5 | 300 | Held 125 psi 5 minutes. Held at 300 psi. | Pass |

Figure 7:
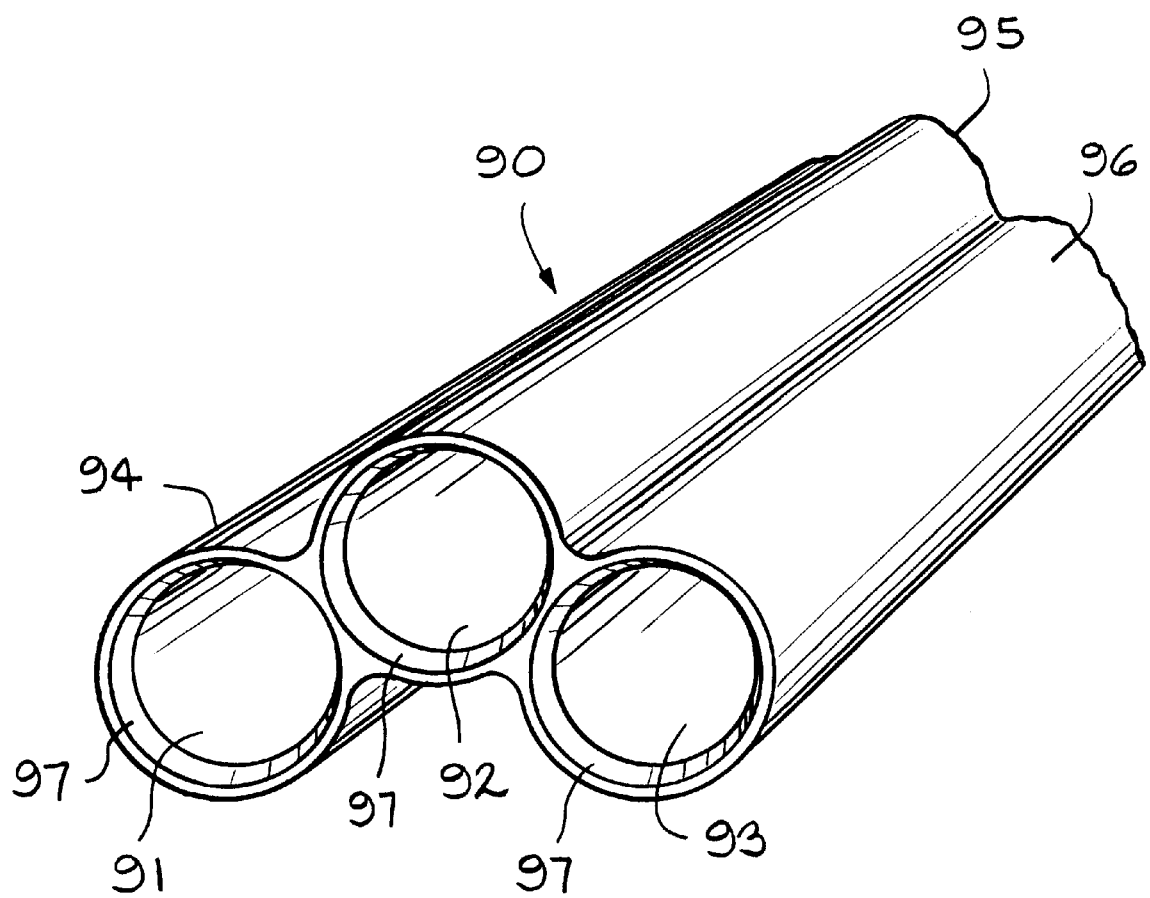
FIG. 7 is a perspective view showing a length of tubing having three integral tubular sections, each of which may be joined with the connector of the present invention.

Referring now to FIG. 7, there is shown a further embodiment of tubing 90 having three separate passageways 91, 92 and 93 of three integral and unitarily formed tubular portions 94, 95 and 96 forming the multi-celled tubular member. Each of the tubular portions 94, 95 and 96 has a chamfer 97 at the end 98 to which each of the connectors is to be inserted. These tubular portions could have connected thereto (1) three individual connectors or (2) a multiple three-unit type connector or (3) a single connector and a multiple two-unit connector.

Many modifications will become apparent to those skilled in the art. For example, it is within the contemplation of present invention that at least some of the annular barbs could be intermittent with axially extending slots rather than continuous as shown. However, all test results in the foregoing Tables are for connectors having continuous annular barbs. Accordingly, the scope of the present invention should be limited only by the scope of the claims.

I claim:

1. A connector for fastening a length of tubing having an internal surface of predetermined size and an open end, said connector comprising a tubular portion having an internal surface extending along an axis, a contoured exterior and an insertion end portion;
    (a) said insertion end portion including
        (i) first and second end edges, said end edges being spaced apart from each other, each of said end edges extending from a point of origin to a point of terminus;
        (ii) a first tapered edge disposed at an angle to said axis and extending arcuately from the point of origin of said first end edge to the point of origin of said second end edge;
        (iii) a second tapered edge disposed at an angle to said axis and extending arcuately from the point of terminus of said first end edge to the point of terminus of said second end edge; and
    (b) said contoured exterior including
        (i) a plurality of spaced apart surfaces;
        (ii) a plurality of annular barbs spaced axially from said end edges and extending outwardly from areas between said spaced apart surfaces, each said barb including
    (1) a first surface tapering outwardly from one of said spaced apart surfaces in a direction away from said insertion end,
    (2) a second surface extending inwardly toward an adjacent spaced apart surface, and
    (3) an apex between said first surface and said second surface.

2. The connector according to claim 1 wherein said first and second end edges lie in a plane perpendicular to said axis.

3. The connector according to claim 1 wherein said internal surface is cylindrical.

4. The connector according to claim 1 wherein said annular barbs are continuous.

5. The connector according to claim 1 wherein the apex of each of said annular barbs is sharp.

6. The connector according to claim 1 wherein the apex of a first barb defines an annulus of predetermined size and the apex of a second barb spaced axially further from said end edges than said first barb defines an annulus having a size greater than said predetermined size.

7. The connector according to claim 1 wherein each of said first tapered edge and said second tapered edge follow a curved path.

8. In combination
(a) a deformable tubular member having a cylindrical internal surface of predetermined diameter and an open end; and
(b) a connector having a tubular portion engaged to said internal surface through said open end, said tubular portion having
 (i) a cylindrical internal surface extending along an axis,
 (ii) an insertion end portion positioned in said open end including
  (1) first and second end edges, said end edges being spaced apart from each other, each of said end edges extending from a point of origin to a point of terminus,
  (2) a first tapered edge disposed at an angle to said axis extending from the point of origin of said first end edge to the point of origin of said second end edge,
  (3) a second tapered edge disposed at an angle to said axis extending from the point of terminus of said first end edge to the point of terminus of said second end edge; and
 (iii) a contoured exterior including
  (1) a plurality of spaced apart cylindrical surfaces,
  (2) a plurality of annular barbs extending outwardly from areas between said cylindrical surfaces, each said annular barb including
   (A) a first surface tapering outwardly from one of said cylindrical surfaces in a direction away from said first and second end edges,
   (B) a second surface extending inwardly toward a cylindrical surface adjacent said one cylindrical surface, and
(c) an apex between said first surface and said second surface, said annular barbs deforming said tubular member internal surface outwardly, said combination characterized in that said deformable tubular member has a chamfer extending at an angle from said open end to said cylindrical internal surface, the intersection of said chamfer with said open end defining a circle having a diameter larger than the diameter of the cylindrical surfaces of said contoured exterior whereby, upon insertion of said connector into said tubing open end, said first and second end edges initially engage said chamfer and expand said open end and continued further insertion causes all portions of said tubular member contacted by said connector to be deformed to a larger size.

9. In combination
(a) a deformable tubular member having a cylindrical internal surface of predetermined diameter and an open end; and
(b) a connector having a tubular portion engaged to said internal surface through said open end, said tubular portion having
 (i) a cylindrical internal surface extending along an axis,
 (ii) an insertion end portion positioned in said open end including
  (1) first and second end edges, said end edges being spaced apart from each other, each of said end edges extending from a point of origin to a point of terminus.
  (2) a first tapered edge disposed at an angle to said axis extending from the point of origin of said first end edge to the point of origin of said second end edge.
  (3) a second tapered edge disposed at an angle to said axis extending from the point of terminus of said first end edge to the point of terminus of said second end edge; and
 (iii) a contoured exterior including
  (1) a plurality of spaced apart cylindrical surfaces.
  (2) a plurality of annular barbs extending outwardly from areas between said cylindrical surfaces, each said annular barb including
   (A) a first surface tapering outwardly from one of said cylindrical surfaces in a direction away from said first and second end edges,
   (B) a second surface extending inwardly toward a cylindrical surface adjacent said one cylindrical surface, and
   (C) an apex between said first surface and said second surface, said annular barbs deforming said tubular member internal surface outwardly, the diameter of said tubular member internal surface prior to insertion of said connector being substantially the same as the diameter of said connector cylindrical internal surface.

10. The combination according to claim 8 wherein said connector first and second end edges lie in a plane perpendicular to said axis.

11. The combination according to claim 8 wherein said annular barbs are continuous.

12. The combination according to claim 8 wherein the apex of each of said annular barbs is sharp.

13. The combination according to claim 8 wherein the apex of a first barb defines an annulus of predetermined size and the apex of a second barb spaced axially further from said end edges than said first barb defines an annulus having a size greater than said predetermined size.

14. In combination
(a) a deformable tubular member having a cylindrical internal surface of predetermined diameter and an open end; and
(b) a connector having a tubular portion engaged to said internal surface through said open end, said tubular portion having
 (i) a cylindrical internal surface having a diameter substantially equal to said predetermined diameter extending along an
 (ii) an insertion end portion positioned in said open end including
  (1) first and second end edges, said end edges being spaced apart from each other, each of said end edges extending from a point of origin to a point of terminus, (2) a first tapered edge disposed at an angle to said axis extending from the point of origin of said first end edge to the point of origin of said second end edge, (3) a second tapered edge disposed at an angle to said axis extending from the point of terminus of said first end edge to the point of terminus of said second end edge; and (iii) a contoured exterior including (1) a plurality of spaced apart cylindrical surfaces, (2) a plurality of annular barbs extending outwardly from areas between said cylindrical surfaces, each said annular barb including (A) a first surface tapering outwardly from one of said cylindrical surfaces in a direction away from said first and second end edges, (B) a second surface extending inwardly toward a cylindrical surface adjacent said one cylindrical surface and (C) an apex between said first surface and said second surface, said annular barbs deforming said tubular member internal surface outwardly.

15. A method for assembling a connector to a deformable tubular member having an internal surface of a predetermined diameter and an open end comprising the steps of providing (a) a connector having a tubular portion with an internal surface extending along an axis, a contoured exterior and an insertion end portion;

(i) said insertion end portion including (1) first and second end edges, said end edges being spaced apart from each other, each of said end edges extending from a point of origin to a point of terminus;

(2) a first tapered edge disposed at an angle to said axis extending from the point of origin of said first end edge to the point of origin of said second end edge;

(3) a second tapered edge disposed at an angle to said axis extending from the point of terminus of said first end edge to the point of terminus of said second end edge; and (ii) said contoured exterior including (1) a plurality of spaced apart surfaces;

(2) a plurality of annular barbs spaced axially from said end edges and extending outwardly from areas between said spaced apart surfaces, each said barb including (A) a first surface tapering outwardly from one of said spaced apart surfaces in a direction away from said insertion end, (B) a second surface extending inwardly toward an adjacent spaced apart surface, and (C) an apex between said first surface and said second surface; and (b) engaging said first and second end edges to said length of tubing at said open end and moving said connector into said tubular member to a point at which said annular barbs are engaged to said internal surface, said connector expanding the portions of said tubular member contacted thereby.

16. The method according to claim 15 further including the step of providing a chamfer tapering inwardly and away from said open end and engaging said first and second end edges to said chamfer.

17. The method according to claim 15 wherein said tubular member predetermined diameter is substantially the same as the diameter of said connector internal surface internal diameter.

18. The method according to claim 7 further including the step of providing a chamfer tapering inwardly and away from said open end and engaging said first and second end edges to said chamfer.

19. A method for assembling a connector to a deformable tubular member having an internal surface of a predetermined diameter and an open end comprising the steps of providing (a) a connector having a tubular portion with an internal surface extending along an axis, a contoured exterior and an insertion end portion, said internal surface having a diameter substantially the same as said tubular member predetermined diameter;

(i) said insertion end portion including (1) first and second end edges, said end edges being spaced apart from each other, each of said end edges extending from a point of origin to a point of terminus;

(2) a first tapered edge disposed at an angle to said axis extending from the point of origin of said first end edge to the point of origin of said second end edge;

(3) a second tapered edge disposed at an angle to said axis extending from the point of terminus of said first end edge to the point of terminus of said second end edge; and (ii) said contoured exterior including (1) a plurality of spaced apart surfaces;

(2) a plurality of annular barbs, extending outwardly from areas between said spaced apart surfaces, each said barb including (A) a first surface tapering outwardly from one of said spaced apart surfaces in a direction away from said insertion end, (B) a second surface extending inwardly toward an adjacent spaced apart surface, and (C) an apex between said first surface and said second surface; and (b) engaging said first and second end edges to said length of tubing at said open end and moving said connector into said tubular member to a point at which said annular barbs are engaged to said internal surface, said connector expanding the portions of said tubular member contacted thereby.

20. A method for assembling a connector to a deformable tubular member having an internal surface of a predetermined diameter, an open end and a chamfer tapering inwardly and away from said open end comprising the steps of providing (a) a connector having a tubular portion with an internal surface extending along an axis, a contoured exterior and an insertion end portion;

(i) said insertion end portion including first and second end edges, said end edges being spaced apart from each other;

(ii) said contoured exterior including (1) a plurality of spaced apart surfaces;

(2) a plurality of annular barbs extending outwardly from areas between said spaced apart surfaces, each said barb including (A) a first surface tapering outwardly from one of said spaced apart surfaces in a direction away from said insertion end, (B) a second surface extending inwardly toward an adjacent spaced apart surface, and (C) an apex between said first surface and said second surface; and (b) engaging said first and second end edges to said length of tubing at said chamfer and moving said connector into said tubular member to a point at which said annular barbs are engaged to said internal surface, said connector expanding the portions of said tubular member contacted thereby.

21. The method according to claim 20 wherein said tubular member predetermined diameter is substantially the same as the diameter of said connector internal surface internal diameter.

22. The method according to claim 21 further including the step of providing a chamfer tapering inwardly and away from said open end and engaging said first and second end edges to said chamfer.

23. The method according to claim 21 further including the step of deforming said tubular member open end to enlarge its size in one direction while reducing its size in a second direction perpendicular to said one direction and inserting said end edges in said open end by aligning said end edges in said one direction.

24. The method according to claim 19 further including the step of deforming said tubular member open end to enlarge its size in one direction while reducing its size in a second direction perpendicular to said one direction and inserting said end edges in said open end by aligning said end edges in said one direction.

25. The connector according to claim 1 wherein said insertion end portion is provided with a first chamfer extending from said first tapered edge outwardly to said exterior and a second chamfer extending from said second tapered edge outwardly to said exterior.

* * * * *

UNITED STATES PATENT AND TRADEMARK OFFICE
CERTIFICATE OF CORRECTION

PATENT NO. : 6,158,784  Page 1 of 1
DATED : December 12, 2000
INVENTOR(S) : Cecil Lee Lavendar It is certified that error appears in the above-identified patent and that said Letters Patent is hereby corrected as shown below:

Column 10,
Line 62, after the word "an", insert the word -- axis --.

Signed and Sealed this

Thirteenth Day of April, 2004

JON W. DUDAS
*Acting Director of the United States Patent and Trademark Office*